United States Patent [19]

Tsubota

[11] Patent Number: 4,763,172
[45] Date of Patent: Aug. 9, 1988

[54] IMAGE SCANNER APPARATUS
[75] Inventor: Junichi Tsubota, Yokohama, Japan
[73] Assignee: Kabushiki Kaisha Toshiba, Kawasaki, Japan
[21] Appl. No.: 2,231
[22] Filed: Jan. 12, 1987
[30] Foreign Application Priority Data
Jan. 17, 1986 [JP] Japan .................................. 61-7267
[51] Int. Cl.⁴ ...................... G03B 27/48; G03B 27/50
[52] U.S. Cl. .................................... 355/50; 355/3 SH
[58] Field of Search ............ 355/50, 75, 3 SH, 14 SH; 271/258, 3.1

[56] References Cited
U.S. PATENT DOCUMENTS

| 4,564,792 | 1/1986 | Fukushi ............................... 318/254 |
| 4,620,782 | 11/1986 | Kurando et al. ................ 355/14 SH |
| 4,627,709 | 12/1986 | Kitajima et al. .................. 355/3 SH |
| 4,662,738 | 5/1987 | Kasuya ........................... 355/14 SH |

FOREIGN PATENT DOCUMENTS
3104660 2/1981 Fed. Rep. of Germany .

OTHER PUBLICATIONS
Official Action from German Patent Office 3/3/88.

Primary Examiner—Richard A. Wintercorn
Attorney, Agent, or Firm—Cushman, Darby & Cushman

[57] ABSTRACT

When originals with their image to be scanned are placed in an original-feeding tray, this placement is sensed by an original placing sensor. In accordance with this result of sensing, a CPU controls drivers to automatically separate the originals placed in the tray. In the meantime, several predetermined input settings can be made. Therefore, when an image scan start instruction is provided, the CPU, without thereafter separating the originals, permits the originals to be immediately sent and scanned.

18 Claims, 9 Drawing Sheets

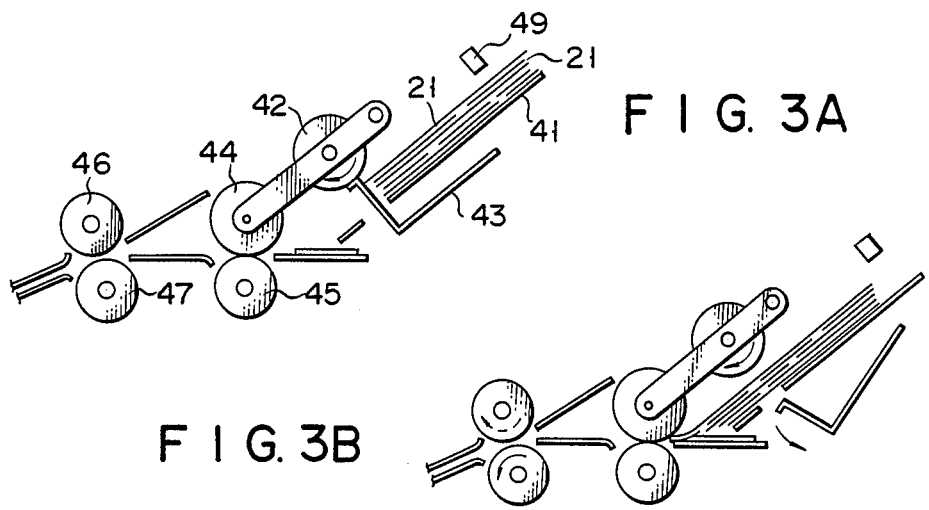
FIG. 3A
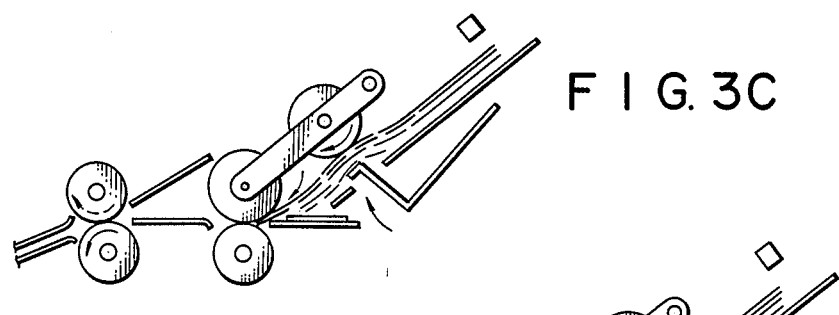
FIG. 3B
FIG. 3C
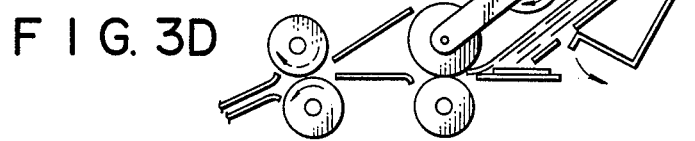
FIG. 3D
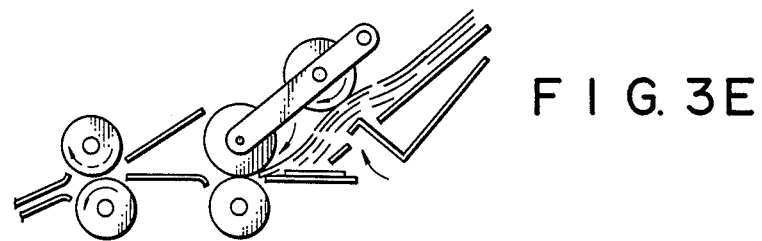
FIG. 3E

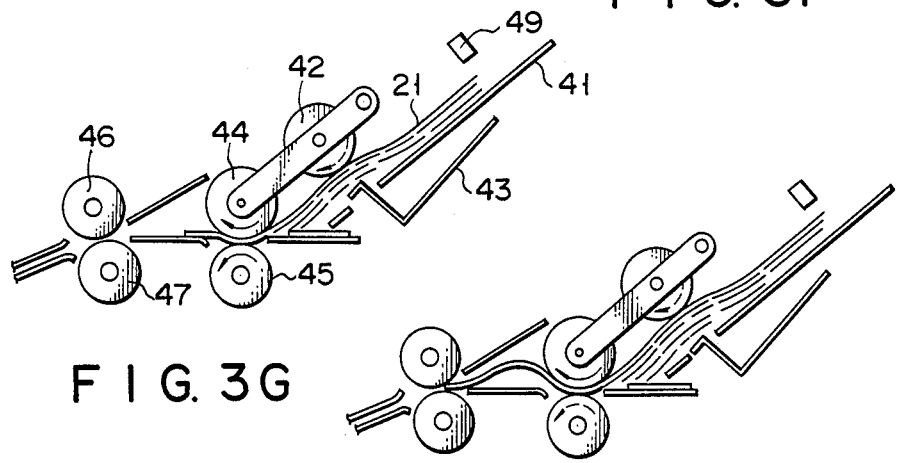
FIG. 3F
FIG. 3G
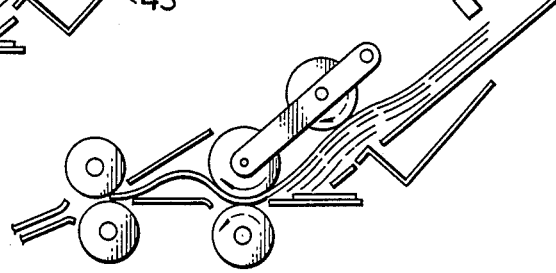
FIG. 3H
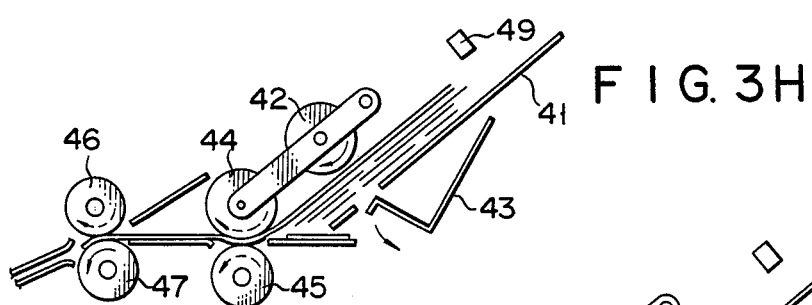
FIG. 3I
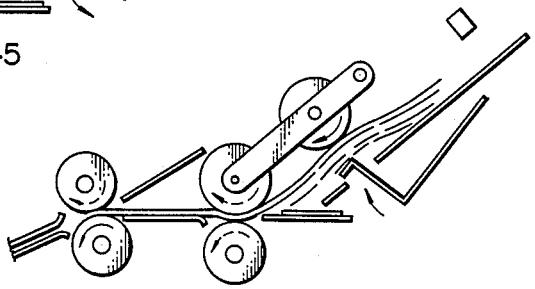
FIG. 3J
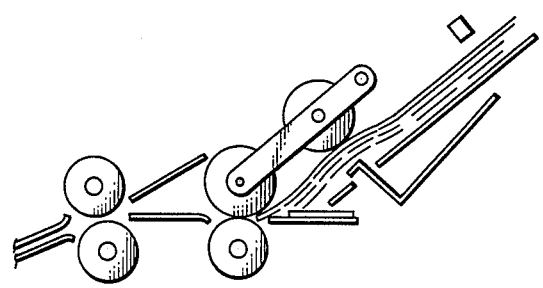

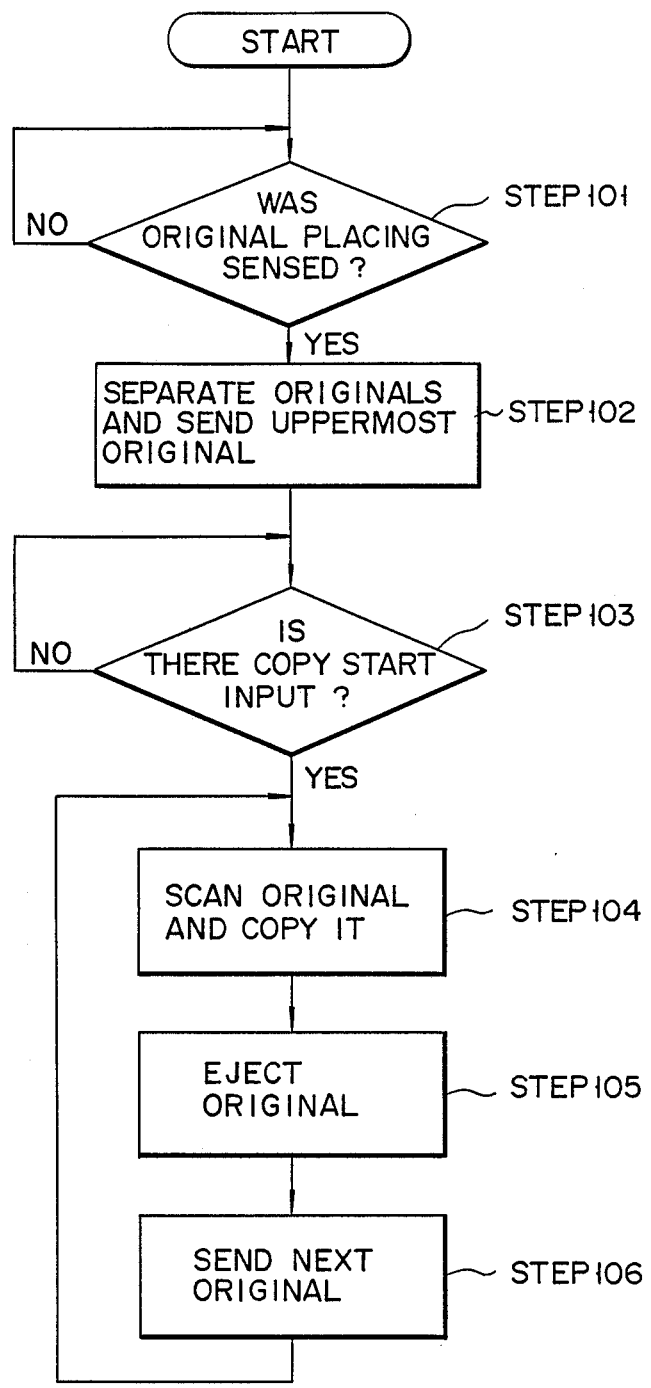

IMAGE SCANNER APPARATUS

BACKGROUND OF THE INVENTION

This invention relates to an image scanner apparatus, having a document feeder for carrying a set of originals, one by one, and more particularly to an image scanner apparatus which is capable of automatically separating the set of originals in response to the sensing of the setting thereof.

Previously known image scanner apparatuses have been copying machines, and original scanner apparatuses used for image information file apparatuses. Some such image scanner apparatuses are equipped with a document feeder as an original carriage device. For example, the original scanner apparatus used for the image information file apparatus performs separation and carriage in the document feeder in response to an "automatic paper (original) supply and scan" instruction, which is supplied from the image information file apparatus.

More specifically, in the operation of automatic paper supply and scan by users, first, originals are set or placed in a paper supply part of the document feeder. Next, the retrieval code or title, etc. of the placed originals are input from a keyboard provided in the image information file apparatus. Subsequently, a "paper supply and scan" key, provided on the keyboard, for providing a "paper supply and scan" instruction is pressed or actuated. Thus, a "paper supply and scan" instruction is output from a CPU in the image information file apparatus to the original scanner apparatus.

The original scanner apparatus, having received this instruction, outputs a "paper separation" instruction to the document feeder; this "paper separation" instruction serves to separate the originals placed in the document feeder. Thus, the document feeder drives its separation rollers to separate the placed originals. Next, the original scanner apparatus outputs an "original carriage" instruction to the document feeder. The document feeder, in response to this instruction, drives its original carriage rollers to send the originals, one by one, to the scanning position of the original scanner apparatus.

However, the original scanner apparatus as mentioned above involves the shortcoming of a slow operation time, since the originals are separated after the "paper supply and scan" instruction is supplied from the image information file apparatus and thereafter, they are sent to the scanning position.

SUMMARY OF THE INVENTION

In view of the shortcoming of the prior art, an object of this invention is to provide an image scanner apparatus equipped with a document feeder, which is capable of a reduced operation time.

In accordance with this invention, there is provided an image scanner apparatus, comprising: means for supporting a set of originals thereon; means for detecting that the originals have been placed on the supporting means to output a detection signal; means for separating the originals placed on the supporting means in response to the detection of the detecting means; means for scanning the image of each originals separated by the separating means; means for inputting an instruction to initiate the scanning operation of the scanning means, and means for permitting the scanning means to scan the originals in response to the instruction of the inputting means.

A more complete understanding of this invention can be attained by considering the following detailed description in conjunction with the accompanying drawings, in which like reference numerals refer to like elements in several views.

BRIEF DESCRIPTION OF THE DRAWINGS

FIGS. 3A to 3J are views for explaining the original separating operation in the document feeder shown in FIG. 2;

FIG. 10 is a flowchart for explaining another operation of the CPU in the copying machine.

DETAILED DESCRIPTION OF THE PREFERRED EMBODIMENTS

Figure 1:
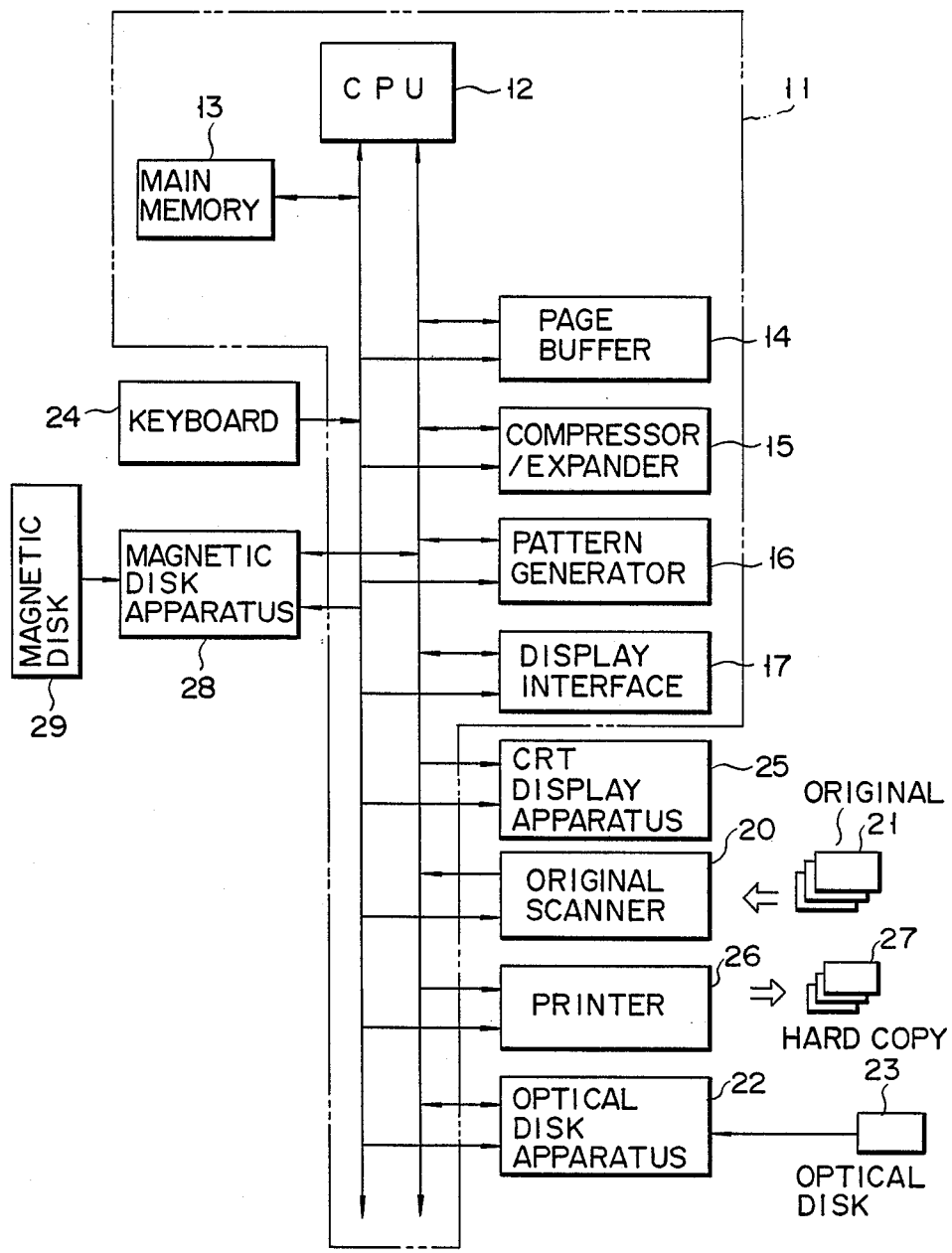
FIG. 1 is a schematic diagram of an image information file apparatus using an original scanner apparatus, as an image scanner apparatus, equipped with a document feeder, in accordance with this invention.

Referring now to the drawings, one embodiment of this invention will be explained below.

FIG. 1 schematically shows an image information file apparatus, in block form, for which an original scanner apparatus, as an image scanner apparatus, is used in accordance with this invention. The image information file apparatus 11 is constructed, for example, by a CPU 12 for performing several kinds of control, a main memory 13, a buffer memory 14 which has, for example, a storage capacity corresponding to the image information covering several pages of A4 size originals, a compression/expansion circuit 15 for compressing the image information (reducing the redundancy) or expanding it (restoring the reduced redundancy), a pattern generator 16 in which pattern information such as characters, symbols, etc., is stored, a display interface 17, etc.

The image information file apparatus 11 is connected, as seen from FIG. 1, with an original scanner apparatus 20, an optical disk apparatus 22, a keyboard 24, a CRT display apparatus 25, a printer 26 and a magnetic disk apparatus 28, which will be explained below, respectively.

The original scanner apparatus 20, serving as an image scanner in accordance with this invention, is equipped with a document feeder, described later, by which originals or documents 21 are carried to an original stand and placed thereon. The original scanner apparatus 20 two-dimensionally scans the originals 21, using photo-electric conversion elements such as a CCD line image sensor to pick up the images thereof, in such a manner as disclosed in e.g. JP-A-59-105,762. Thus, electric signals corresponding to the image information contained in the originals 21 are obtained.

The optical disk apparatus 22 serves to successively store, in an optical disk 23, pieces of the image information, etc., scanned by an original scanner apparatus 20 and supplied through the file apparatus 11. The optical disk apparatus also serves to read out necessary information from the optical disk 23.

The keyboard 24 is provided for inputting information or commands to file apparatus 11, such as the input of a specific retrieval code corresponding to the image information, the operation by a "paper supply and scan" key (not shown), the input of several kinds of operation instructions, etc.

The CRT display apparatus 25 as a display portion serves as an output apparatus. This display apparatus displays the image information taken by the original scanner apparatus 20 and supplied through the file apparatus 11, the image information read out from the optical disk apparatus 22 and supplied from the file apparatus, etc. This CRT display apparatus 25 forms a general or host image information display apparatus together with the display interface 17 in the file apparatus 11.

The printer 26 is provided for outputting, as hard copies 27, the image information taken by the original scanner apparatus 20 and supplied from the file apparatus 11, the image information read out from the optical disk apparatus 22 and supplied from the file apparatus 11, etc.

The magnetic disk apparatus 28 is provided for storing retrieval data for each piece of image information in a magnetic disk 29; the retrieval data consists of the retrieval code input by the keyboard 24, the size of the image information corresponding to the retrieval code and the memory address on the optical disk 23 where the image information is stored. This storage is made for each optical disk.

Figure 2:
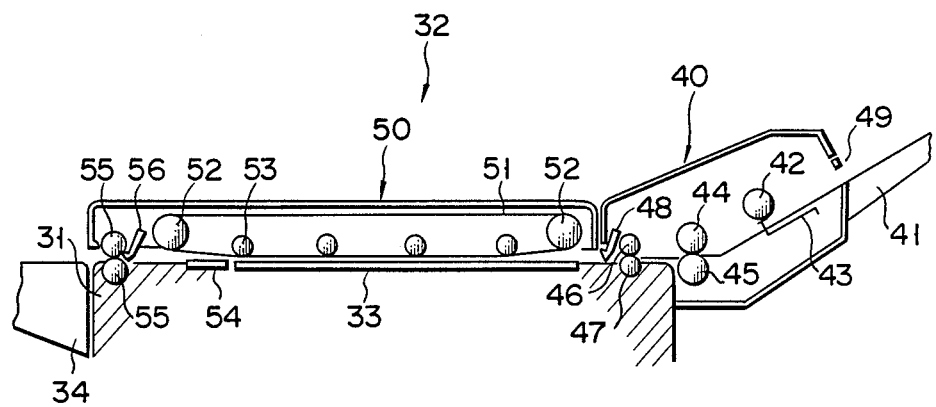
FIG. 2 is a schematic sectional view of the main parts of the original scanner apparatus, as an image scanner apparatus, equipped with a document feeder, in accordance with this invention.

FIG. 2 shows, in cross section, an image scanner apparatus having a document feeder in accordance with this invention, e.g. the original scanner apparatus 20, as mentioned above. On the body 31 of the original scanner apparatus 20 is mounted an automatic document feeder 32 for automatically carrying or supplying the originals 21. On the body 31 is also provided an original placing or setting glass (original stand) 33 as an original placing portion on which the originals 21 received from the document feeder 32 are placed or set. Below the original placing glass 33 are provided an optical system (not shown) and a CCD line image sensor which are for scanning the originals 21 placed on the original placing glass 33.

The automatic document feeder 32 consists of a take-in section 40 for taking in the originals and a transport section 50 for sending them. The take-in section 40 comprises an original-feeding tray 41 in which the originals 21 are placed or set, a feed roller 42, a shutter 43 and separation rollers 44, 45 for separating the originals placed on the tray 41, aligning rollers 46, 47 for sending to the transport section 50, one by one, the originals 21 separated by these separation rollers 44 and 45, a jam detection switch 48, and an original setting or placing sensor 49 for detecting the fact that the originals 21 have been placed on the tray 41. This original placing sensor 49 may be a well-known type, consisting of a light emitting element and light receiving element, switch, etc.

The originals 21 placed on the tray 41 are separated by the shutter 43 and only one sheet at the top of a stack of the originals 21 is sent out to the aligning rollers 46, 47 by the separation rollers 44, 45. This operation and the arrangement therefore will be explained briefly with reference to FIGS. 3A to 3J. First, when the originals 21 are placed on the tray 41, as shown in FIG. 3A, the feed roller 42 and the aligning roller 47 are rotated, as shown in FIGS. 3B to 3E, in an arrow direction, by a motor which will be described later, and also the shutter 43 repeats an up-and-down motion by a predetermined number of times (e.g. 6 times). Thus, the originals 21 placed on the tray 41 are separated and also the uppermost original sheet 21 is sent to the separation rollers 44, 45 by the pressing force of the shutter 43 and the rotation of the feed roller 42. Then, the separation rollers 44 and 45 remain stationary.

After the originals 21 are thus separated, as shown in FIGS. 3F and 3G, only one sheet thereof is sent out to the aligning rollers 46 and 47 when the separation roller 44 is rotated in a normal direction (as shown with an arrow) by the motor mentioned above. In this case, the feed roller 42 is not rotated by the motor, but it is rotated in the normal direction (as shown with a broken line arrow) because of the friction force with the originals. The separation roller 45 performs the operations of normal rotation, stop and reverse rotation. More specifically, in the case where two or more sheets of the originals are inserted between the separation rollers 44 and 45, when the friction coefficient is comparatively small, the separation roller 45 reversely rotates or stops to send the lower sheet(s) of the originals 21 back towards the feed roller 42; when the friction coefficient is comparatively large, the separation roller 45 stops, thereby sending out the uppermost sheet of the originals. When only one sheet is inserted, the separation roller 45 rotates normally.

When only one sheet of the originals 21 is sent between aligning rollers 46 and 47, as shown in FIGS. 3H and 3I, the feed roller 42 and the aligning roller 47 rotate normally and also, the shutter 43 repeats an up-and-down motion for a predetermined number of times (e.g. 3 times). Thus, the sheet which has reached between the aligning rollers 46 and 47 is sent to the transport section 50.

The transport section 50, as disclosed in U.S. Pat. No. 4,564,792 by Y. Fukushi, for example, comprises a transport belt 51 as original sending means, belt rollers 52 for loading the belt 51 and carrying it, four pressure rollers 53 for pressing the belt 51 onto the originals placing glass 33, a stopper 54 as original stopping means for temporarily stopping and holding the original 21 sent onto the original placing glass 33, exit rollers 55 for ejecting the original sheet 21, and a jam detection switch 56. The original sheet 21 ejected from the send section 50 is received in a original receiving tray 34, fixed to the body 31 of the original scanner apparatus 20.

Figure 4:
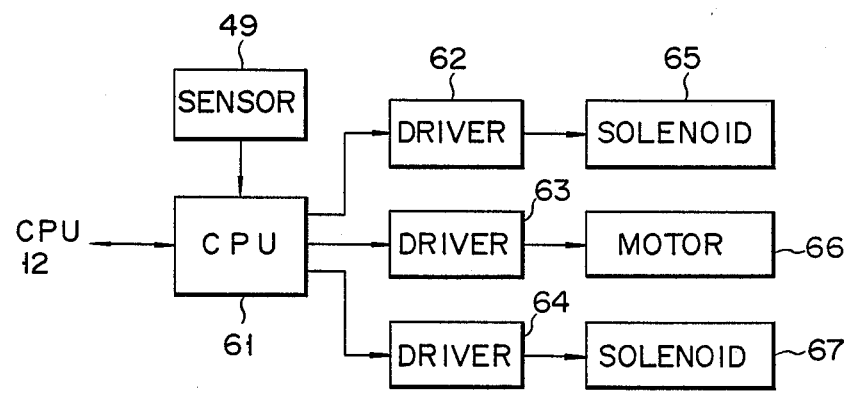
FIG. 4 is a block diagram of a main part of a control circuit in the original scanner apparatus.

FIG. 4 shows, in block form, a main part of the control circuit used in the original scanner apparatus. A CPU 61, in response to the signals received from the CPU 12 of the image information file apparatus 11 and the original placing sensor 49, controls drivers 62, 63, 64, etc., to control the carriage and scan of the originals. The driver 62 excites a shutter solenoid 65 for moving the shutter 43. The driver 63 drives a motor 66 for rotating the feed roller 42, the separation rollers 44, 45, the aligning rollers 46, 47 and the exit rollers 55. The driver 64 excites a solenoid 67 for carrying the stopper 54. The CPU 61, in response to the sense signal received from the original placing sensor 49, controls the drivers 62 and 63, thereby separating the originals in the manner as mentioned above.

Figure 5:
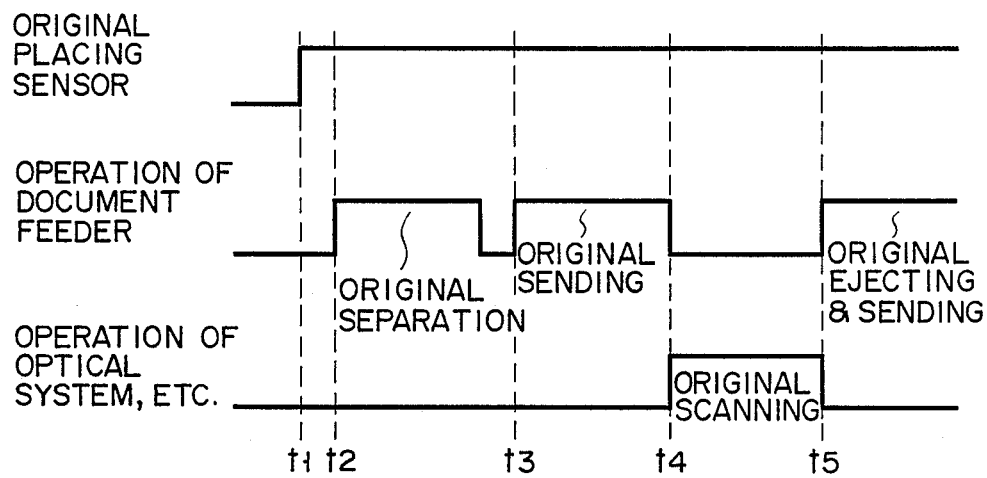
FIG. 5 is a timing chart for explaining the operation of the original scanner apparatus.
Figure 6:
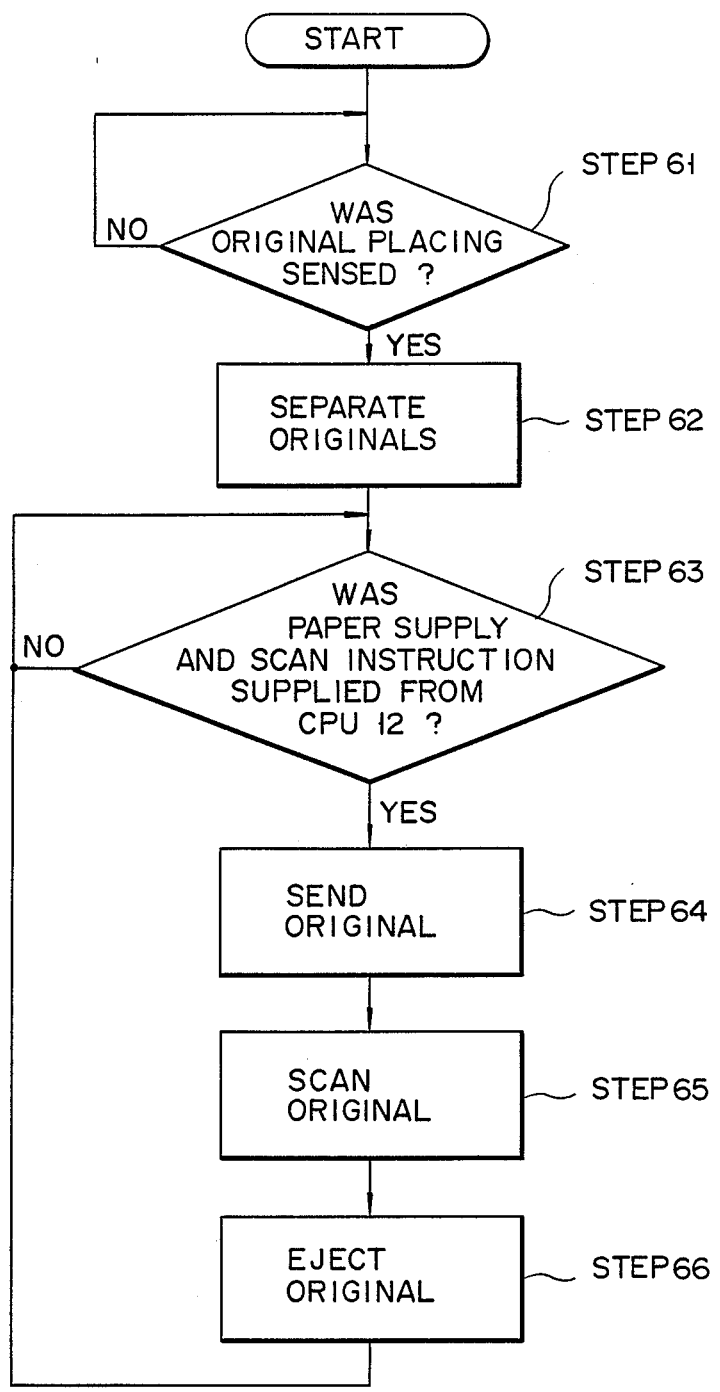
FIG. 6 is a flowchart for explaining one operation of a CPU in the original scanner apparatus.

The operation of the original scanner apparatus 20 having the arrangement mentioned above will be explained with reference to FIGS. 5 and 6. At a time t1, one or more sheets of the originals 21 are placed on the tray 41 by an operator, as shown in FIG. 3A. When this placement is sensed by the original placing sensor 49, the sense signal is supplied to the CPU 61.

After a predetermined elapsed time from when the sense signal has been supplied (STEP 61), i.e., at a time t2, the CPU 61 controls the drivers 62 and 63 so as to separate the originals, as shown in FIGS. 3B to 3G, and also to send the uppermost original towards the aligning rollers 46, 47 (STEP 62). In this case, when the originals 21, placed on the tray 41, are sent to the shutter 43 because of the inclination of the tray, a certain short time, from when the front edges of the originals have been sensed by the original placing sensor 49 to when they reach the shutter 43, is required. The above predetermined time ($t_2 - t_1$) is set considering this short time. In this embodiment, the predetermined time ($t_2 - t_1$) is set about 1 second.

On the other hand, the operator, after the originals have been placed or set, inputs the titles, such as a retrieval code, from the keyboard 24 for the image information file apparatus 11. After the input of the titles, at a time t3 of FIG. 5, the operator presses or actuates a "paper supply and scan" key (not shown) on the keyboard 24. Thus, the "paper supply and scan" instruction is sent from the CPU 12 to the CPU 61.

When the "paper supply and scan" instruction is supplied (STEP 63), the CPU 61 controls the driver 63 so as to send the original from the take-in section 40 to the transport section 50, as shown in FIGS. 3H to 3J. Further, the CPU 61 controls the driver 64 so as to temporarily stop and hold the original, sent by the transport belt 51 in the transport section 50, with the stopper 54, thus placing the original on the original placing glass 33 (STEP 64). Thereafter, at a time t4, the CPU 61 controls the optical system and CCD line image sensor (not shown) to scan the original (STEP 65). After the scan of the original, at a time t5, the CPU 61 controls the driver 63 so as to move the transport belt 51, thereby ejecting the original onto the tray 34 (STEP 66). Then, when the "paper supply and scan" instruction is supplied again, a next original sheet is placed on the original placing glass 33 for the scan thereof, and the next original is scanned.

Meanwhile, the originals 21, immediately after having been separated, are not sent to and placed on the original placing glass 33, but this operation is suspended until the "paper supply and scan" instruction is supplied. The reason thereof is as follows. The titles such as the retrieval code are generally described on a first page of the originals so that the operator inputs the titles while looking at the page. Thereafter, the transport section 50 is next carried or raised by the operator to expose the original placing glass 33, and places the first page of the originals thereon. The original of that page is scanned by pressing the "scan" key (not shown) of the keyboard 24, and ejected by carrying the transport section 50. Thereafter, the originals of a second page et seq. are successively scanned by pressing the "paper supply and scan" key. In short, if any original is placed on the original placing glass 33, the original of the first page cannot be scanned.

Figure 7:
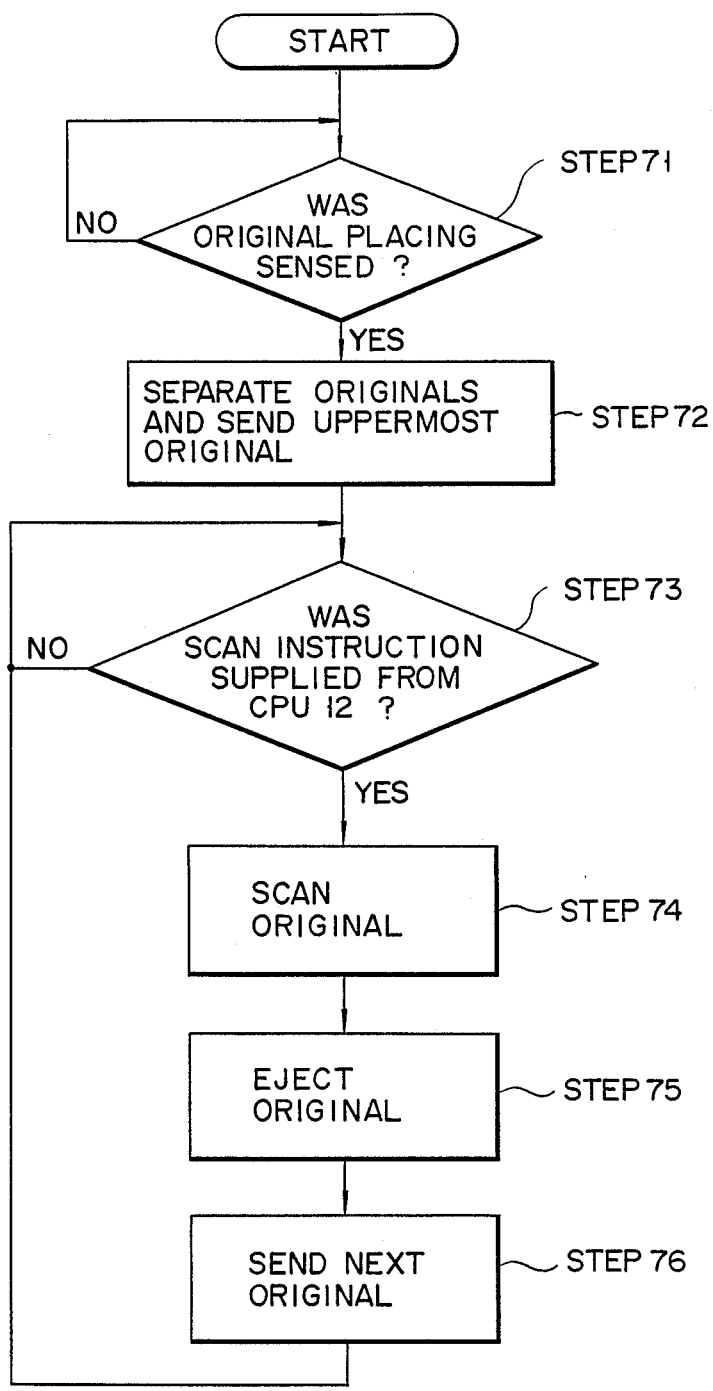
FIG. 7 is a flowchart for explaining another operation of the CPU in the original scanner apparatus.

However, the originals may be sent to and placed on the original placing glass 33 immediately after they have been separated. FIG. 7 is a flowchart showing the operation of the CPU 61 in this case. When the sense signal is supplied from the original placing sensor 49 to the CPU 61 (STEP 71), the originals 21 are separated after a predetermined elapsed time. Next, the uppermost original is sent from the take-in section 40 to the transport section 50 and is placed on the original placing glass 33 (STEP 72). Thereafter, when the "scan" instruction is supplied from the CPU 12 to the CPU 61 by pressing the "scan" key of the keyboard 24 (STEP 73), the original is scanned (STEP 74). After the scan of the original, it is ejected toward the tray 34 (STEP 75) and also the next original is placed of on the original placing glass 33 for the scan thereof (STEP 76).

The above explanation has been given for the original scanner apparatus as an image scanner apparatus. The image scanner apparatus, however, is not limited to this description. This invention can be applied to any other image scanner apparatuses having a document feeder. An example of such an image scanner apparatus is a copying machine. The copying machine sets the size of copy papers, the scale factor of expansion/reduction, etc., after the originals have been set. Therefore, if the originals are separated during the setting, in accordance with this invention, the operation time of the copying machine can be reduced.

Figure 8:
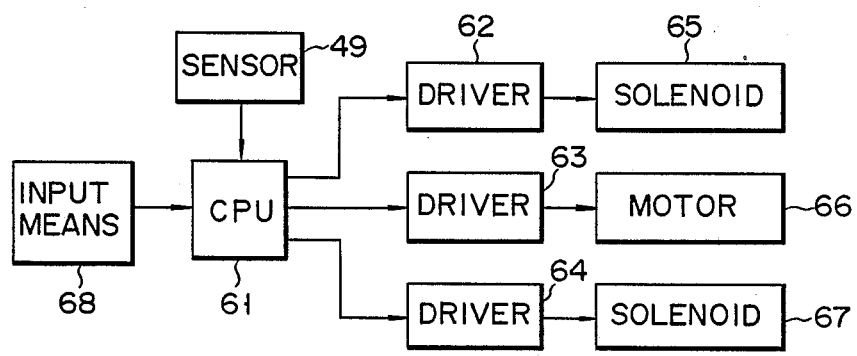
FIG. 8 is a view of the main part of a control circuit of a copying machine, as an image scanner apparatus, equipped with a document feeder, in accordance with this invention.

FIG. 8 shows, in block form, the main part of the control circuit of a copying machine having the document feeder 32 as shown in FIG. 2. In response to the signals received from input means 68, which are for setting the size of the copy papers, the scale factor of expansion/reduction, etc., and the signals received from the original placing sensor 49, the CPU 61 controls the drivers 62, 63 and 64, etc., to control the original carriage and original copying. The driver 62 excites the shutter solenoid 65 for moving the shutter 43. The driver 63 drivers the motor 66 for rotating the feed roller 42, the separation rollers 44, 45, the aligning rollers 46, 47 and the exit rollers 55. The driver 64 excites the solenoid 67 for carrying the stopper 54. The CPU 61, in response to the sense signal received from the original placing sensor 49, controls the drivers 62 and 63, thereby separating the originals in the manner as mentioned above.

Figure 9:
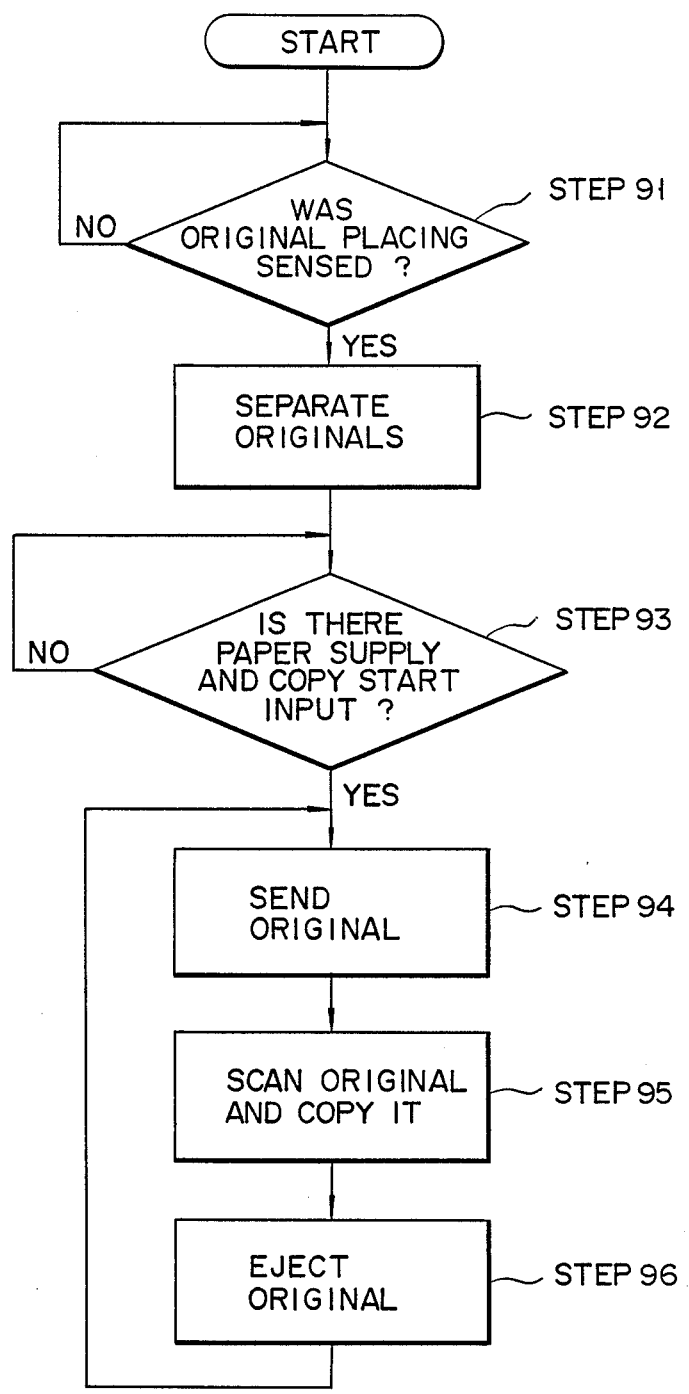
FIG. 9 is a flowchart for explaining one operation of a CPU in the copying machine.

FIG. 9 is a flowchart of the CPU 61 of the copying machine having the arrangement mentioned above. First, one or more sheets of the originals 21 are placed on the tray 41. When this placement is sensed by the original placing sensor 49, the sense signal is supplied to the CPU 61 (STEP 91). The CPU 61, after a predetermined elapsed time, controls the drivers 62 and 63 so as to separate the originals 21 and also to send the uppermost original towards the aligning rollers 46, 47 (STEP 92). In this case, when the originals 21, placed on the tray 41, are sent to the shutter 43 because of the inclination of the tray 41, a certain short time, from when the front edge of the originals have been sensed by the original placing sensor 49 to when they reach the shutter 43, is required. The above predetermined time is set considering this short time.

On the other hand, the operator, after the originals have been set, sets the size of the copy papers, the scale factor of expansion/reduction, etc., by means of the input means 68. After this setting, the operator presses a "paper supply and copy start" key (not shown) of the input means 68.

When the "paper supply and copy start" key is pressed (STEP 93), CPU 61 controls the driver 63 so as to send the originals from the take-in section 40 to the transport section 50. Further, the CPU 61 controls the driver 64 so as to temporarily stop and hold the original sent by the transport belt 51 in the transport section 50, with the stopper 54, thus placing the original on the original placing glass 33 (STEP 94). Thereafter, the CPU 61 controls the optical system and CCD line image sensor (not shown) to scan the original and copy it (STEP 95). The CPU 61, after the scan and copy, controls the driver 63 so as to move the transport belt 51, thereby exhausting the original toward the tray 34 and also placing the next original on the original placing glass 33 for the scan and copy thereof (STEP 94).

Similarly to the case of the above original scanner apparatus 20, in this embodiment also, the originals may be sent to and placed on the original placing glass 33 immediately after they have been separated. FIG. 10 is a flowchart showing the operation of the CPU 61 in this case. When the sense signal is supplied from the original placing sensor 49 to the CPU 61 (STEP 101), the originals are separated after a predetermined elapsed time. Next, the uppermost original 21 is sent from the take-in section 40 to the transport section 50 and placed on the original placing glass 33 (STEP 72). Thereafter, when the "copy start" key (not shown) of the input means 68 is pressed (STEP 103), the original is scanned and copied (STEP 104). After the scan and copy thereof, the original is ejected toward the tray 34 (STEP 105) and also the next original is placed on the original placing glass 33 for the scan and copy thereof (STEP 106).

In this way, in accordance with these embodiments, the set originals are separated while the predetermined input settings are being made after the setting of originals has been sensed, so that the operation time can be reduced.

What is claimed is:

1. An image scanner apparatus comprising:
   means for supporting a set of originals thereon;
   means for detecting that the originals have been placed on said supporting means to output a detection signal;
   means for separating the originals placed on said supporting means in response to the detection of said detecting means;
   means for scanning the image of each original separated by said separating means;
   means for inputting an instruction to initiate the scanning operation of said scanning means; and
   means for permitting said scanning means to scan the originals in response to the instruction of said inputting means.

2. The image scanner apparatus according to claim 1, further comprising sending means for sending the originals separated by said separating means, one by one, from said supporting means to said scanning means.

3. The image scanner apparatus according to claim 2, said sending means sending the originals in response to the instruction of said inputting means.

4. The image scanner apparatus according to claim 3, said separating means comprising original separating means for separating said originals and control means for, in response to the reception of the detection signal, controlling said separating means so that it separates the originals.

5. The image scanner apparatus according to claim 4, said control means controlling the original separating means so that it separates the originals after a predetermined elapsed time from when said detection signal has been received.

6. The image scanner apparatus according to claim 3, said image scanner apparatus comprising a part of an image information file apparatus; said inputting means being included in said image information file apparatus; said separating means further comprising carriage means for sending out said separated originals to said sending means; and said control means, in accordance with the supply of the instruction from said inputting means, controlling said carriage means for sending out the separated originals to said sending means.

7. The image scanner apparatus according to claim 3, said image scanner apparatus comprising a part of an image information file apparatus; said inputting means being included in said image information file apparatus; said separating means further comprising carriage means for sending out said separated originals to said sending means; and said control means, before the supply of the instruction from said inputting means, controlling said carriage means for sending out the original to be first scanned to said sending means.

8. The image scanner apparatus according to claim 3, said separating means further comprising carriage means for sending out said separated originals to said sending means; and said control means, in accordance with the supply of the instruction from said inputting means, controlling said carriage means so that it sends out the separated originals to said sending means.

9. The image scanner apparatus according to claim 3, said separating means further comprising carriage means for sending out said separated originals to said sending means; and said control means, before the supply of the instruction from said inputting means, controlling said carriage means for sending out the originals to be first scanned to said sending means.

10. A method for scanning the image of an original located at a scanning position, comprising the steps of:
    placing originals with their image to be scanned into a supporting means;
    detecting that said originals have been placed;
    separating the placed originals when the placing of said originals has been detected;
    inputting an instruction to initiate the scanning operation; and
    scanning the image of each original in response to the instruction.

11. The method for scanning the image of an original according to claim 10, further comprising the step of sending the separated originals, one by one, to said scanning position.

12. The method for scanning the image of an original according claim 11, wherein the step of sending is performed in response to the instruction in said inputting step.

13. The method for scanning the image of an original according to claim 12, wherein said step of separating the originals is performed after a predetermined elapsed time from when the placing of said originals has been detected.

14. The method for scanning the image of an original according to claim 13, said detecting step for detecting that said originals have been placed being performed by detecting the status of a light emitting element and a light receiving element.

15. The method for scanning the image of an original according to claim 14, wherein said method further comprises the step of, after the step of separating the originals, previously sending an original to be first scanned to said scanning position before the supply of said instruction in said inputting step.

16. An image data processor comprising:
scanner means for scanning the image of originals to output the image data corresponding to the scanned images, said scanner means including means for supporting a set of originals thereon, means for detecting that the originals have been placed on said supporting means, means for separating the originals placed on said supporting means in response to the detection of said detecting means, means for scanning the image of each original separated by said separating means, means for receiving an instruction to initiate the scanning operation of said scanning means, means for permitting said scanning means to scan the originals in response to the instruction of said receiving means, and means for outputting the image data corresponding to the images scanned by said scanning means; and processing means for outputting the instruction to said receiving means of said scanner means, receiving the image data output from said outputting means of said scanner means, and processing the received image data.

17. The image data processor according to claim 16, said scanner means further including sending means for sending the originals separated by said separating means, one by one, from said supporting means to said scanning means.

18. The image data processor according to claim 17, said sending means sending the originals in response to the instruction received by said receiving means.

* * * * *